United States Patent [19]

Gomez, Jr.

[11] Patent Number: 5,581,062
[45] Date of Patent: Dec. 3, 1996

[54] SIDE-MOUNTABLE LIQUID LEVEL SENSOR ASSEMBLY

[75] Inventor: Edward Gomez, Jr., Douglas, Ariz.

[73] Assignee: Standex International Corporation, Salem, N.H.

[21] Appl. No.: 108,047

[22] Filed: Aug. 17, 1993

[51] Int. Cl.$^6$ ........................................... H01H 35/18
[52] U.S. Cl. .................. 200/84 C; 73/322.5; 340/625
[58] Field of Search ..................... 307/118; 335/205; 73/308, 313, 319, 322.5; 340/623, 624; 200/84 R, 84 C, 61.2

[56] References Cited

U.S. PATENT DOCUMENTS

| | | |
|---|---|---|
| 3,576,413 | 4/1971 | Craeger et al. . |
| 3,588,404 | 6/1971 | Akeley . |
| 3,699,561 | 10/1972 | Putt . |
| 3,750,124 | 7/1973 | Barnes et al. . |
| 3,750,125 | 7/1973 | Ross et al. . |
| 3,849,770 | 11/1974 | Hayashida . |
| 3,868,485 | 2/1975 | Sykes et al. . |
| 3,890,478 | 6/1975 | Riddel . |
| 3,934,103 | 1/1976 | Walstra . |
| 3,978,299 | 8/1976 | Takai . |
| 3,997,744 | 12/1976 | Higo . |
| 4,020,481 | 4/1977 | Nakagawa ........................ 340/244 E |
| 4,090,049 | 5/1978 | Nogami ............................. 200/84 C |
| 4,090,050 | 5/1978 | Siiberg . |
| 4,139,750 | 2/1979 | Rau . |
| 4,158,964 | 6/1979 | McCrea et al. . |
| 4,191,951 | 3/1980 | Fuzzell . |
| 4,217,779 | 8/1980 | Masuda et al. . |
| 4,270,033 | 5/1981 | Hoffmann . |
| 4,318,078 | 3/1982 | Reinartz et al. . |
| 4,356,729 | 11/1982 | Kubota et al. . |
| 4,481,389 | 11/1984 | Johnson . |
| 4,513,185 | 4/1985 | Walters . |
| 4,583,085 | 4/1986 | Beller . |
| 4,594,584 | 6/1986 | Pfeiffer et al. . |
| 4,600,820 | 7/1986 | Bruder et al. . |
| 4,609,796 | 9/1986 | Bergsma . |
| 4,637,254 | 1/1987 | Dyben et al. . |
| 4,644,332 | 2/1987 | Graham . |
| 4,744,808 | 5/1988 | Treu . |
| 4,771,272 | 9/1988 | Barnes . |
| 4,796,473 | 1/1989 | Custer . |
| 4,801,926 | 1/1989 | Bitetti . |
| 4,848,151 | 7/1989 | Bruder et al. . |
| 4,883,928 | 11/1989 | Umehara . |
| 4,922,234 | 5/1990 | Murphy . |
| 5,026,954 | 6/1991 | Cebulski . |
| 5,042,300 | 8/1991 | Benjey et al. . |
| 5,050,430 | 9/1991 | Begin et al. . |
| 5,083,115 | 1/1992 | Kamiya . |

FOREIGN PATENT DOCUMENTS

| | | |
|---|---|---|
| 2153327 | 5/1973 | France . |
| 0521573 | 5/1972 | Switzerland . |

OTHER PUBLICATIONS

KIP Leveline Liquid Control "LS1 Series–Sidemount" (date unknown) 1 page.

Primary Examiner—Gerald P. Tolin
Attorney, Agent, or Firm—Wood, Herron & Evans, P.L.L.

[57] ABSTRACT

A side-mountable liquid level sensor utilizes a rubber sealing grommet to temporarily hold the buoyant member within the cylinder of the liquid container opening to facilitate assembly. The buoyant member has an open slot with cooperating limit structure on the buoyant member and sensor rod to facilitate manufacture.

41 Claims, 3 Drawing Sheets

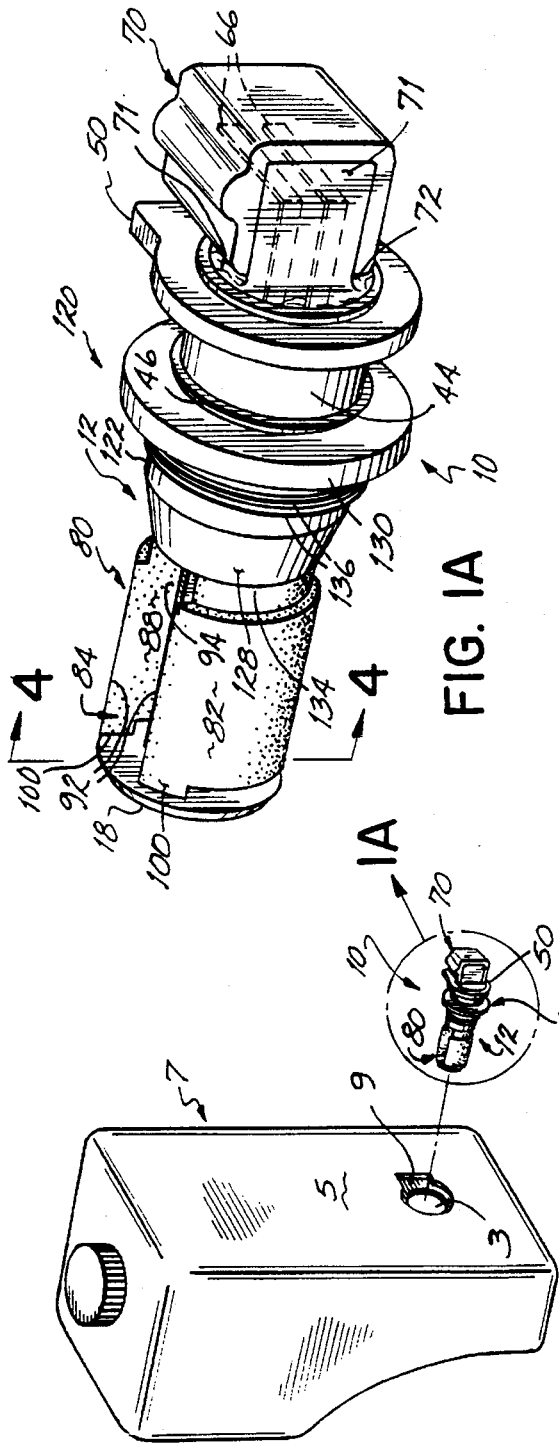
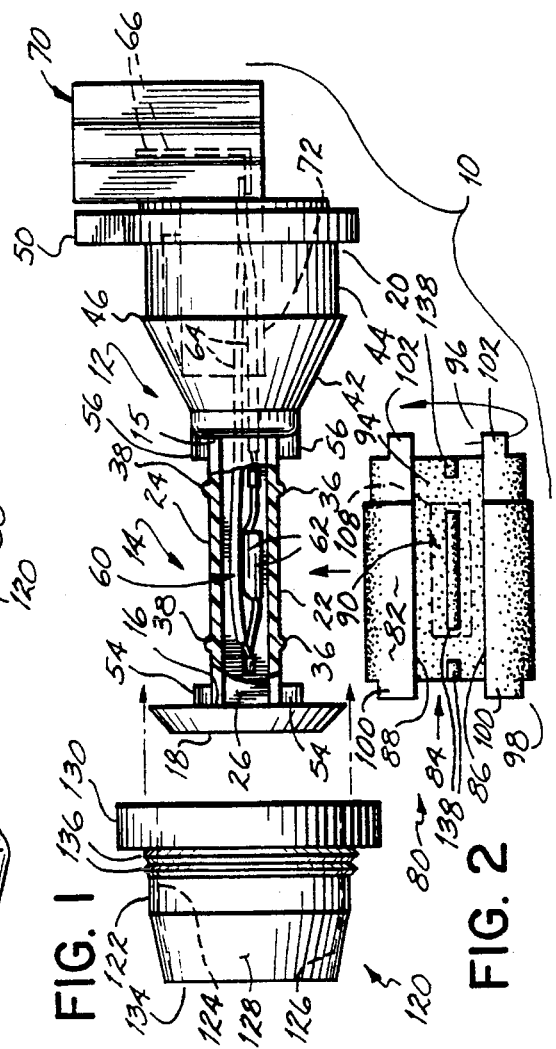
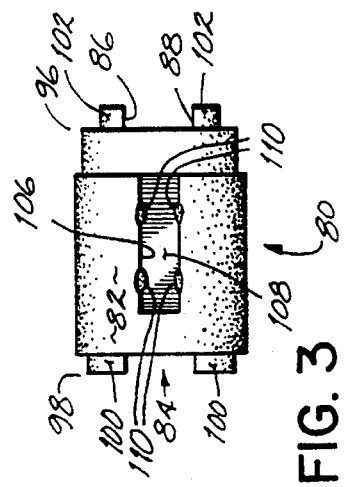

SIDE-MOUNTABLE LIQUID LEVEL SENSOR ASSEMBLY

BACKGROUND OF THE INVENTION

I. Field of the Invention

The present invention relates to liquid level sensors mounted through the sidewall of a liquid container rather than through the top or bottom thereof, and to the method of assembly thereof.

II. Description of Prior Art

To monitor the liquid level in a liquid container, such as an automobile coolant overflow reservoir or windshield washer tank, it has been the practice to provide a liquid level sensor mounted from the top of the container, such as from the cap thereof. Such a liquid level sensor includes a vertical post or rod-like member with a reed switch held adjacent to the top of the rod. The rod passes through the aperture of a toroidal buoyant member mounted around the rod with the toroid carrying a magnet along its top or bottom side so that as the buoyant member rises and falls with the level of liquid in the container, the magnet moves towards and away from the reed switch to open or close same depending on the level of the liquid in the container. An electric circuit connected to the reed switch turns on a light, for example, if the liquid level is unacceptable.

As vehicle manufacturers try to reduce the overall size of the vehicle, there has been a tendency to squeeze the container into locations that make it impractical to mount the liquid level sensor from the cap of the container. As a result, it has been proposed to mount the sensor through the sidewall of the container. Unfortunately, such an arrangement causes the rod to lay horizontal such that the buoyant toroid can no longer move with changes in liquid level.

Various proposals to change the construction of the sensor for side-mount applications are believed to be undesirable. In one proposal, the reed switch is positioned within the rod and the aperture through the buoyant toroid significantly enlarged into a slot so that the buoyant member may rise and fall relative the now-horizontally disposed rod. The magnet is repositioned to the side wall of the buoyant member parallel to the rod so as to open or close the reed switch as the liquid level changes.

While such a proposal now allows for side-mounting the sensor, it is not without important drawbacks, especially with respect to manufacturability and assembly. For example, with the enlarged slot, and to allow for sufficient movement between the rod and magnet, the buoyant member must be free to move outside the cylinder defined by the hole through which the sensor must fit to be mounted through the sidewall of the container. In order to mount the sensor, therefore, the buoyant member must be physically held within that cylinder which presents assembly difficulties.

Additionally, to manufacture the sensor, the buoyant member must be slid over the end of the rod and a retaining clip or the like secured to the end of the rod to prevent the buoyant member from sliding back off of the rod. The cost and time associated with such steps and the additional part is undesirable from a manufacturing perspective.

Moreover, foreign material tends to accumulate in the liquid being monitored. The foreign material has a tendency to clog the moving component(s) of some available side-mountable sensors rendering them less useful.

SUMMARY OF THE INVENTION

The present invention provides a side-mountable liquid level sensor that overcomes the above-mentioned drawbacks. To this end, and in accordance with one feature of the present invention, assembly is greatly enhanced by utilizing the resilient grommet that holds the sensor tightly to the side of the fluid container to also hold the buoyant member during assembly. More specifically, the grommet is slidably receivable on the support structure that supports the rod with the grommet initially being slid mostly off the support with the open end thereof slid over the end of the buoyant member to thus hold it within the defined cylinder. As the sensor is inserted, rod first, through the hole in the sidewall of the liquid container, the held-buoyant member passes easily therethrough after which the grommet meets with the periphery of the hole. Further insertion of the sensor causes the rod and buoyant member to move further into the container with the grommet sliding up, over, and onto the support thereby pushing the buoyant member free of the grommet to allow the buoyant member to now move outside the defined cylinder as necessary.

Manufacturability is also enhanced by providing access to the buoyant member slot through the sidewall of the buoyant member such that the rod may be inserted laterally therethrough. In order to facilitate mounting the buoyant member to the rod, limit structure is formed near the open mouth of the aperture and the adjacent portions of the rod which cooperate to, effectively, close the mouth of the aperture once the member is mounted to the rod. The limit structure also holds the buoyant member on the rod so as to eliminate the time and cost of an added element. A large retaining disc may be integrally formed on the end of the rod as well. A sensor constructed according to the principles of the present invention may include standoffs or projections to define gaps between the buoyant member and the rod which gaps avoid accumulation of foreign material that might otherwise cause sticking of the member.

By virtue of the foregoing there is thus provided a side-mountable liquid level sensor that is cost-effective and simple to manufacture and assemble, and which overcomes certain other drawbacks of available side-mountable liquid level sensors. These and other objects and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the principles of the invention.

FIG. 1 is a perspective view of a side-mountable liquid level sensor, and a side-mount liquid container, in accordance with the principles of the present invention;

FIG. 1A is an enlarged view of the encircled sensor of FIG. 1;

FIG. 2 is a top, exploded and partially cut away view of the sensor of FIG. 1;

FIG. 3 is a bottom plan view of the buoyant member of the sensor of FIG. 1;

DETAILED DESCRIPTION OF THE DRAWINGS

Figure 4C:
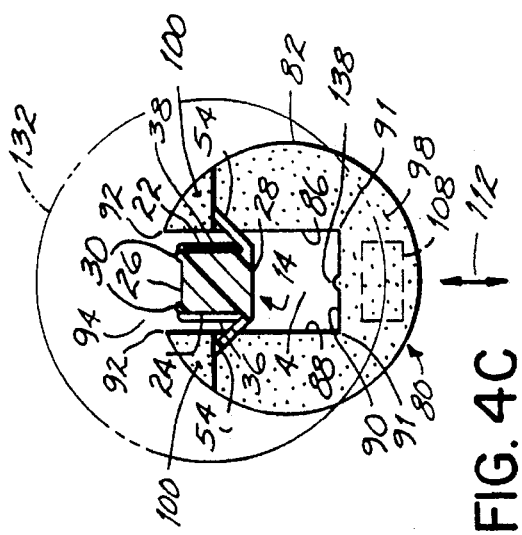
FIGS. 4A–E are views taken along line 4—4 of FIG. 1A for the purpose of describing steps to mount the buoyant member to the rod.

With reference to FIGS. 1, 1A and 2, there is shown a side-mountable liquid level sensor 10 in accordance with the principles of the present invention adapted to be mounted through hole 3 in sidewall 5 of liquid container 7. Sensor 10 includes an injection molded plastic (e.g., polypropylene) component comprised of a support 12 and a rod-like member 14 extending outwardly from and supported by the distal wall 15 of support 12. Formed integral to the distal end 16 of rod 14 is an enlarged disc 18 having a diameter approximately equal to the diameter of support 12 at its proximal end 20 and slightly smaller than the diameter of hole 3 of container 7.

Member 14 has a hollow interior with disc 18 sealing off distal end 16 thereof with proximal end at 15 opening into the interior of support 12. Member 14 is rectangular in cross-section as defined by planar left, right, top and bottom sidewalls 22, 24, 26, 28, respectively (see also FIG. 4A). Top wall 26 may be recessed below the upper edges 30 of left and right sidewalls 22, 24 as seen, for example, in FIG. 4D. Also, formed on sidewalls 22 and 24 are a pair of vertically oriented, triangular cross-section projections 36, 38 which define respective planes (not shown) spaced or gapped from and parallel to walls 22 and 24 for a purpose to be described hereinafter.

Support 12 is formed with tapered distal cone portion 42 and proximal cylinder portion 44, the latter having a diameter slightly smaller than the proximal end 46 of cone 42 to provide a lip thereat. The proximal end 20 of support 12 terminates into an enlarged and keyed flange 50 to mate with pocket 9 around hole 3 of container 7 to facilitate positioning of sensor 10 to the liquid container. Also, formed at respective ends 16 and 15 of rod 14, and merging with the adjacent disc 18 or wall 15, respectively, are a pair of flexible support wings 54, 56 extending outwardly and upwardly from bottom wall 28 away from side walls 22 and 24 at an angle of about 45° to just less than halfway up sides 22, 24. Wings 54 and 56 may be seen to be sideways extensions of rod 14 and thus define portions of rod 14.

Fitted within the interior of member 14 is a switch, such as normally open, 0.5 A current switch rated magnetically actuatable reed switch 60 having its switch contacts 62 extending between ends 16 and 15 along the longitudinal axis of rod 14. Switch 60 may have a sensitivity of between 10 and 50 ampere turns (AT), and is desirably in the 30-40 AT range and may be in the 40-45 range to be less sensitive to electromagnetic signals in the engine compartment. A pair of wires 64 electrically connect respective ones of switch contacts 62 to connector pins 66 held within plastic socket or terminal housing 70 mounted to support 12. Enclosing switch 60 within rod 14 and securing socket 70 to support 12 is material 71 (such as hot melt thermoplastic polyamide resin) filling the interior of support 12 and gripping leg 72 of socket 70 inside support 12.

Sensor 10 also includes buoyant member 80 injected molded from polypropylene with an endothermic blowing or foaming agent. Member 80 is cylindrical in cross-section as defined by generally smooth outer wall 82. Formed within member 80 is a slot 84 having planar left and right sidewalls 86, 88 with a bottom or floor 90 extending between the bottom edges 91 thereof. Sidewalls 86, 88 of slot 84 extend up to and terminate in edges 92 defined along outer wall 82 to define upper aperture or mouth 94 opening into slot 84. The proximal end 96 of member 80 is of a diameter slightly smaller than that defined by outer wall 82, the latter being approximately equal to the diameter of disc 18. Formed at distal end 98 and proximal end 96 of member 80, near slot edges 92, are a pair of projecting arms 100, 102 extending outwardly of the proximal and distal ends, respectively. Arms 100, 102 cooperate with support wings 54, 56 on rod 14 to effectively close mouth 94 of slot 84 with respect to rod 14 to keep member 80 slidably held thereto as will be described.

As seen in FIG. 3, aperture 106 is formed through outer wall 82 along the bottom side thereof. Aperture 106 is approximately the size of switch actuator bar magnet 108 (e.g., .575 inch×0.235 inch×0.120 inch) mounted therein with its north and south poles adjacent respective ones of the proximal and distal ends 96 and 98 of member 80 so as to extend in parallel to the longitudinal axis thereof. Magnet 108 is held in aperture 106 by melting or otherwise deforming portions of the edge of aperture 106 to define tabs 110 overlying magnet 108 to hold same in place.

Sidewalls 86, 88 of slot 84 are spaced apart a distance slightly greater than the distance between the planes defined by rod-wall projections 36, 38 such that when member 80 is mounted to rod 14, member 80 is generally restrained from rotating completely around rod 14 but is otherwise free to slide vertically relative thereto as indicated by arrow 112 in FIG. 4C such that magnet 108 moves towards and away from reed switch 60 to open or close same as appropriate. Also, the spacing provides non-clogging gaps (e.g., slot 84 is about 0.34 inch wide and the respective projections 36 or 38 define a distance of about 0.29 inch wide tip-to-tip) between rod sidewalls 22, 24 and slot sides 86, 88 which allows for some rotation of member 80, i.e., there is a loose fit, to reduce the likelihood of sticking or clogging.

Figure 4B:
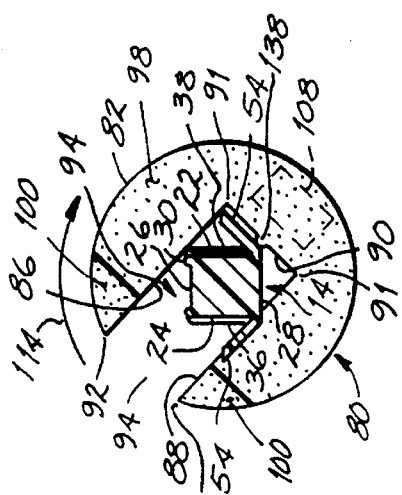
Figure 4A:
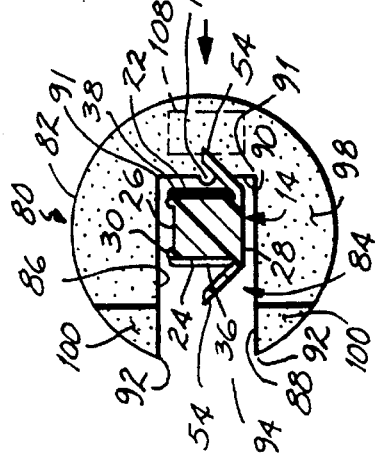

To mount member 80 to rod 14, member 80 is rotated 90° so that slot mouth 94 of slot 84 opens towards a sidewall (e.g., left sidewall 22 as seen in FIG. 4A) and member 80 is slid laterally over rod 14 (and arms 100, 102 over wings 54, 56) so that slot sidewalls 86, 88 are juxtaposed parallel to top and bottom walls 26 and 28 of rod 14. As will be appreciated, end portions of rod 14 will extend out beyond the ends of buoyant member, and it is those portions that hold wings 54, 56. Member 14 is then rotated in the direction of arrow 114 as indicated in FIG. 4B such that arms 100, 102 rotate over wings 54, 56 until slot 84 is upright with sidewalls 86, 88 thereof juxtaposed parallel to vertical projections 36, 38 and rod sidewalls 22, 24 with magnet 108 situated below bottom wall 28 of rod 14, all as seen in FIG. 4C. In this position of member 80, arms 100 and 102 of buoyant member 80 extend out over wing portions 54, 56 of rod 14 in confronting relationship therewith so that member 80 is limited in its downward vertical or lateral movement by cooperation thereof. Arms 100, 102 and wings 54, 56 thus provide cooperating limit structure to hold member 80 onto rod 14 such that mouth 94 of slot 84 is effectively closed. Also, in the event of a freeze and/or thaw of the liquid in container 7, wings 54, 56 can flex to avoid damage to sensor 10. Additionally, wings 54, 56 project out beyond sidewalls 86, 88 of slot 84 to thus confront the ends of member 80 and limit longitudinal travel along rod 14 between support 12 and disc 18. Enlarged size disc 18 aids in protecting member 80 as sensor 10 is slid into container 7 and also aids in keeping member 80 from sliding off the distal end 16 of rod 14 as well. Thus, member 80 is fully captured onto rod 14.

Figure 4E:
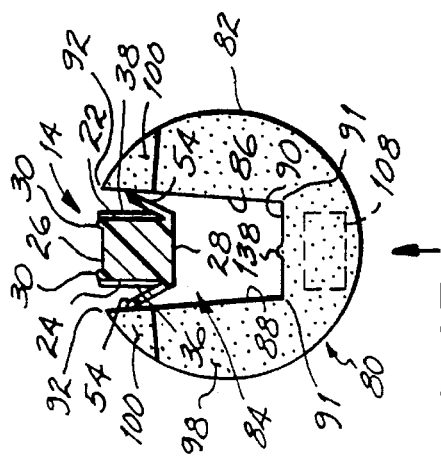
Figure 4D:
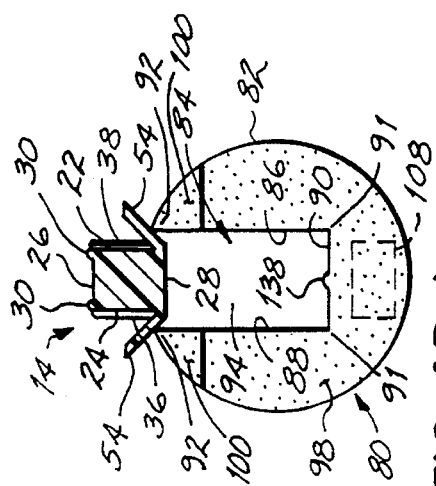

Member 80 may be mounted to rod 14 in an alternative manner by taking advantage of the flexibility of wings 54, 56. In this alternative method of manufacture, slot 84 is aligned with rod 14 with bottom wall 28 adjacent slot opening 94 and the upper surfaces of arms 100, 102 bearing against the bottom, angled surfaces of wings 54, 56 as seen in FIG. 4D. Application of pressure between member 80 and rod 14 causes arms 100, 102 to bear against and partially flex or compress wings 54, 56 as seen in FIG. 4E until arms 100, 102 pass or snap over wings 54, 56 and rod 14 is in slot 84 as seen in FIG. 4C. Thereafter, wings 54, 56 confront arms 100, 102 to prevent member 80 from coming off of rod 14 as previously described. Although not shown, member 80 could be canted along the longitudinal axis of rod 14 during assembly so that a portion of rod 14 is within slot 84 with one set of arms 100, 102 passed over one set of wings 54, 56. The other pair of arms and wings bear against each other to be snapped together as described above.

As will be readily appreciated, when rod 14 is in its horizontal disposition as shown in FIG. 4C, buoyant member 80 will move vertically (i.e. laterally) relative rod 14 depending upon the level of liquid (not shown) around member 80. Consequently, magnet 108 moves towards and away from rod 14 and reed switch 60 therein to thus open or close switch 60 depending upon the level of the liquid. Preferably, the depth of slot 84 and the relationship of wings 54, 56 to arms 100, 102 is such that member 80 normally has at least ¼ inch of travel. Switch 60 is coupled via connector pins 66 to an electrical circuit (not shown) to activate the appropriate indicators.

To mount sensor 10 to side-mount liquid level fluid container 7, a resilient grommet 120 (comprised of thermoplastic elastomer, rubber or other resilient material) is provided. Grommet 120 has an exterior wall 122 shaped like support 12 and has an inner cylindrical wall 124 slightly smaller than the diameter of disc 18 to be frictionally fit thereover. The distal end 126 of wall 124 is tapered to follow the taper of cone segment 128 of grommet 120. Prior to mounting member 80 to rod 14, grommet 120 is slid, back or flange end 130 first, over disc 18 and rod 14 until grommet 120 rests up against support 12. Member 80 is then mounted as described above. It will be appreciated that member 80 has a lower-most position (shown in FIG. 4C) in which a portion of member 80 lies outside of cylinder 132 defined by the size of the hole 3 in container 7 through which sensor 10 is to be mounted (see FIG. 5A). As a result, assembly requires that member 80 be held in an upper position with magnet 108 close to rod 14 to thereby keep member 80 within the confines of the space defined by cylinder 132. To facilitate mounting sensor 10 to container 7, and to eliminate the more difficult task of manually holding the member 80 within cylinder 132, grommet 120 may be advantageously employed to simplify the assembly process.

Figure 5A:
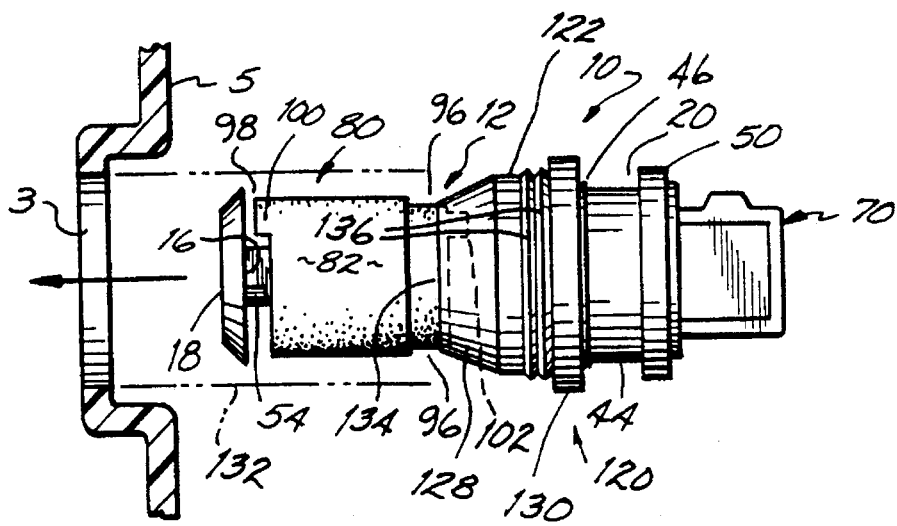
FIGS. 5A–C are views showing the sensor of FIG. 1 being assembled to the side-mount liquid container.
Figure 5B:
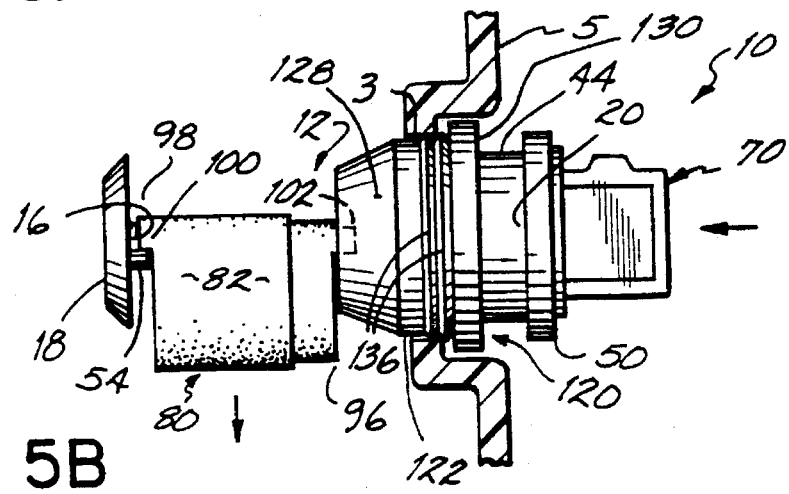
Figure 5C:
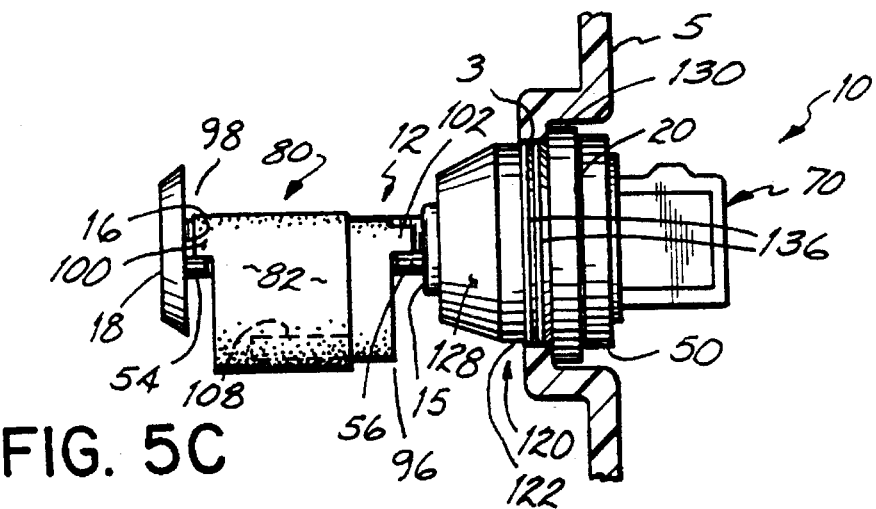

To this end, and in accordance with the principles of the present invention, proximal end or shoulder 96 of buoyant member 80 is receivable within opening 134 of cone portion 126 of grommet 120 as seen in FIG. 5A. In this position of grommet 120, the back end 130 thereof is primarily resting over cone portion 42 of support 12 and operates to restrain member 80 within cylinder 132 and thus to permit easy insertion of disc 18 and member 80 through hole 3 in sidewall 5 of liquid container 7. As sensor 10 is inserted therethrough, such as by pushing from behind support 12, grommet 120 meets up with the periphery of hole 3 after member 80 is completely passed through the hole. Thereafter, further insertion of sensor 10, i.e., further force on support 12, causes grommet 120 to slide up over cone portion 42 while releasing its hold on member 80 (FIG. 5B) which is forced to move with rod 14 by impact of wings 56 confronting proximal end 96 of member 80. When sensor 10 is fully inserted, grommet 120 slides up over lip 46 and rests over cylinder portion 44 of support 12 in a snug liquid-tight relationship therewith and with annular sealing lips 136 on sidewall 122 in sealing engagement with the periphery of hole 3 as seen in FIG. 5C. Also, member 80 is completely free of grommet 120 and is thus free to operate by moving up and down relative rod 14, including outside of cylinder 132, in relation to the level of liquid in container 7.

When sensor 10 is fully seated in container 7, keyed flange 50 fits within pocket 9 formed around hole 3. Pocket 9 is shaped to flange 50 to limit orientation of sensor 10 so that it is essentially positioned with magnet 108 at the bottom of the unit so that member 80 is free to slide up and down and not impact against the sidewalls 22, 24 of rod 14. And, as member 80 slides, the gaps between slot sidewalls 86, 88 and rod sidewalls 22, 24 are maintained open due to vertical projections 36 and 38 so that material cannot become lodged therebetween and interfere with operation of sensor 10. Also, a projection 138 may be provided on floor 90 of slot 84 to prevent sticking between rod bottom wall 28 and slot floor 90. Support 12 and rod 14 are made relatively short so that sensor 10 projects not more than about 61–62 mm into container 7 to thus allow sensor 10 to be used in tight quarters.

In use, grommet 120 is slid over rod 14 and member 80 mounted thereto as previously described. With grommet 120 holding member 80, sensor 10 is slid, disc 18 first, into hole 3 of container 7 until grommet 120 mates snugly into hole 3 with flange 50 in pocket 9. Member 80 is then free to move relative rod 14 depending upon the level of liquid in container 7. Reed switch 60 is electrically connected via pins 66 to appropriate electrical circuitry (not shown) such that the relative position of member 80 to rod 14 will control the circuitry. Specifically, member 80 travels at least ¼ inch between a first, low liquid level position with rod 14 located proximate top edges 92 of slot 84 (see FIG. 4C) and a second, high liquid level position with rod 14 located proximate lower or bottom edges 91 of slot 84. The state of switch 60 indicates to the circuitry whether the liquid level is low or high accordingly.

While the present invention has been illustrated by description of an embodiment of the invention and while the illustrative embodiment has been described in considerable detail, it is not intended to restrict or in any way limit the scope of the appended claims to such detail. Additional advantages and modifications will readily appear to those skilled in the art. For example, projections 36, 38 could be formed on sidewalls 86, 88 rather than sidewalls 22, 24. Similarly, projection 138 could be formed on rod bottom wall 28. The invention in its broader aspects is therefore not limited to the specific details, representative apparatus and methods, and illustrative examples shown and described. Accordingly, departures may be made from such details without departing from the spirit or scope of the general inventive concept.

Having described the invention, what is claimed is:

1. A side-mountable liquid level sensor comprising:

a support member for side-mounting the sensor to a liquid container;

a rod-like member extending from the support member such as to be in a generally horizontal disposition with the sensor side-mounted to the liquid container;

a switch coupled to the rod-like member;

a buoyant member having a slot extending therein, the slot being defined by a pair of spaced apart sides each having a top edge and a bottom edge, the rod-like member received between the sides of the slot of the buoyant member such that the buoyant member is movable vertically with the sensor held in the liquid container between a first position and a second position depending upon liquid level in the liquid container, the rod-like member being located proximate the top edges of the slot and spaced away from the bottom edges of the slot in the first position, the rod-like member being located proximate the bottom edges of the slot and spaced away from the top edges of the slot in the second position;

a plurality of projections formed between at least one of the slot sides of the buoyant member and the adjacent side of the rod-like member and cooperating to define respective planar vertical surfaces of the slot and the rod-like member with the planar vertical surfaces being in close proximity to each other such that the buoyant member is free to move vertically relative the rod-like member but is normally prevented from rotating completely about the rod-like member, the projections defining a non-clogging gap between the slot and rod-like sides; and a switch actuator coupled to the buoyant member for activating the switch depending upon the position of the buoyant member relative the rod-like member.

2. The sensor of claim 1 further comprising projections formed between each of the slot sides of the buoyant member and respective adjacent sides of the rod-like member.

3. The sensor of claim 2 wherein the plurality of projections are formed on the adjacent rod-like member sides.

4. The sensor of claim 3 wherein the slot sides are each generally planar walls.

5. The sensor of claim 1 wherein the switch is a magnetically actuatable switch and the switch actuator is a magnet.

6. The sensor of claim 5 wherein the buoyant member includes an aperture proximate the bottom end of the slot with the magnet being secured within the aperture.

7. The sensor of claim 5 wherein the magnetically actuated switch is a reed switch having switch contacts aligned with the rod-like member longitudinal axis.

8. The sensor of claim 7 wherein the rod-like member is hollow and the reed switch is situated therein.

9. The sensor of claim 1 wherein the top edges of the slot are defined along a first portion of an outer wall of the buoyant member defining a slot opening sized to pass the rod-like member therethrough whereby to provide lateral access to the slot through the slot opening in the outer wall of the buoyant member.

10. The sensor of claim 9 further comprising limit structure on the rod-like member and on the buoyant member cooperating to prevent the rod-like member from passing out of the slot through the slot opening.

11. The sensor of claim 10 wherein the cooperating limit structure includes a wing formed on the rod-like member and an arm formed on the buoyant member positioned to be in confronting relationship with one another.

12. The sensor of claim 11 wherein the wing is flexible.

13. The sensor of claim 10 wherein the cooperating limit structure on the rod-like member defines a portion of the rod-like member and the cooperating limit structure on the buoyant member includes a projection extending into confronting relationship to the limit structure portion of the rod-like member.

14. The sensor of claim 1 wherein the support member includes a grommet support surface, the sensor further comprising a resilient grommet slidably received on one of the support surface and the buoyant member, the grommet being movable between a first position wherein the grommet is received by the buoyant member to restrain movement thereof whereby to facilitate insertion of the sensor into the liquid container, and a second position wherein the grommet is received by the support surface free of the buoyant member to allow movement thereof relative to the rod-like member.

15. A side-mountable liquid level sensor comprising:

a support member including a grommet support surface for side-mounting the sensor to a liquid container;

a rod-like member extending from the support member such as to be in a generally horizontal disposition with the sensor side-mounted to the liquid container;

a switch coupled to the rod-like member;

a buoyant member having a slot extending therein and receiving the rod-like member, the slot having an upper end and a lower end and sufficient room to allow the buoyant member to move vertically with the sensor held in the liquid container between a first position and a second position depending upon the liquid level in the liquid container, the rod-like member being located proximate the top end of the slot and spaced away from the bottom end of the slot in the first position, the rod-like member being located proximate the bottom end of the slot and spaced away from the top end of the slot in the second position;

a switch actuator coupled to the buoyant member for activating the switch depending upon the position of the buoyant member relative the rod-like member;

a resilient grommet slidably received on one of the support surface and the buoyant member, the grommet being movable between a first position wherein the grommet is received by the buoyant member to restrain movement of the buoyant member whereby to facilitate insertion of the sensor into the liquid container, and a second position wherein the grommet is received by the support surface free of the buoyant member to allow movement thereof relative to the rod-like member; and a projection coupled to at least one of the rod-like member and the support member and movable therewith for pushing the buoyant member free of the grommet between the first and second positions thereof.

16. The sensor of claim 15 wherein the buoyant member includes a cylindrical proximal end sized to fit within the grommet.

17. The sensor of claim 15 wherein the buoyant member includes a cylindrical proximal end within the grommet and the projection confronts the proximal end of the buoyant member within the grommet.

18. The sensor of claim 15 wherein the top end of the slot is defined along a first portion of an outer wall of the buoyant member defining a slot opening sized to pass the rod-like member therethrough whereby to provide lateral access to the slot through the slot opening in the outer wall of the buoyant member.

19. The sensor of claim 18 further comprising limit structure on the rod-like member and on the buoyant member cooperating to prevent the rod-like member from normally passing out of the slot through the slot opening.

20. The sensor of claim 19 wherein the slot extends from an end of the buoyant member, the cooperating limit structure including an arm on the buoyant member extending beyond the end of the buoyant member and a wing extending outwardly of the rod-like member in confronting relationship with the arm.

21. The sensor of claim 20 wherein the wing is flexible.

22. The sensor of claim 20 wherein the wing defines the pushing structure.

23. The sensor of claim 19 wherein the cooperating limit structure on the rod-like member defines a portion of the rod-like member and the cooperating limit structure on the buoyant member includes a projection extending in confronting relationship with the limit structure portion of the rod-like member.

24. The sensor of claim 15 wherein the switch is a magnetically actuatable switch and the switch actuator is a magnet.

25. The sensor of claim 24 wherein the buoyant member includes an aperture proximate the bottom end of the slot with the magnet being secured within the aperture.

26. The sensor of claim 24 wherein the magnetically actuatable switch is reed switch having switch contacts aligned with the rod-like member longitudinal axis.

27. The sensor of claim 26 wherein the rod-like member is hollow and the reed switch is situated therein.

28. A side-mountable liquid level sensor comprising:

a support member for side-mounting the sensor to a liquid container;

a rod-like member extending from the support member such as to be in a generally horizontal disposition with the sensor side-mounted to the liquid container;

a switch coupled to the rod-like member;

a buoyant member having a slot extending therein and receiving the rod-like member, the slot having an upper end and a lower end and sufficient room to allow the buoyant member to move vertically with the sensor held in the liquid container between a first position and a second position depending upon the liquid level in the liquid container, the rod-like member being located proximate the top end of the slot and spaced away from the bottom end of the slot in the first position, the rod-like member being located proximate the bottom end of the slot and spaced away from the top end of the slot in the second position, wherein the top end of the slot opens to an outside surface of the buoyant member to define a slot opening sized to pass the rod-like member therethrough and into the slot;

limit structure on the buoyant member and on the rod-like member cooperating to prevent the rod-like member from normally passing back out of the slot through the slot opening; and a switch actuator coupled to the buoyant member for activating the switch depending upon the position of the buoyant member relative the rod-like member.

29. The sensor of claim 28 wherein the slot extends completely through the buoyant member with the rod-like member having a free end distal to the support extending out of the slot, the sensor further comprising an enlarged disc integrally formed at the free end of the rod-like member.

30. The sensor of claim 28 wherein the slot extends through the buoyant member between proximal and distal ends thereof with the proximal end being spaced near the grommet support surface, the rod-like member having a distal end extending beyond the distal end of the of the buoyant member, and wherein a portion of the limit structure on the rod-like member is positioned adjacent the distal end thereof in confronting relationship with the distal end of the buoyant member whereby to prevent the buoyant member from sliding longitudinally off the distal end of the rod-like member.

31. The sensor of claim 28 wherein the slot extends from an end of the buoyant member, the cooperating limit structure including an arm on the buoyant member extending beyond the end of the buoyant member and a wing extending outwardly of the rod-like member in confronting relationship with the arm.

32. The sensor of claim 31 wherein the wing is flexible.

33. The sensor of claim 31 wherein the wing is angled relative the slot.

34. The sensor of claim 28 wherein the limit structure is located exteriorly of the slot.

35. The sensor of claim 28 wherein the cooperating limit structure on the rod-like member defines a portion of the rod-like member and the cooperating limit structure on the buoyant member includes a projection extending in confronting relationship to the limit structure portion of the rod-like member.

36. The sensor or claim 28 wherein the cooperating limit structure includes two pairs of wings, one at each respective end of the rod-like member, and two pairs of arms, one extending beyond each respective end of the buoyant member in confronting relationship to a respective pair of wings.

37. The sensor of claim 28 wherein the switch is a magnetically actuatable switch and the switch actuator is a magnet.

38. The sensor of claim 37 wherein the buoyant member includes an aperture proximate the bottom end of the slot with the magnet being secured within the aperture.

39. The sensor of claim 37 wherein the magnetically actuatable switch is a reed switch having switch contacts aligned with the rod-like member longitudinal axis.

40. The sensor of claim 39 wherein the rod-like member is hollow and the reed switch is situated therein.

41. A side-mountable liquid level sensor comprising:

a support member for side-mounting the sensor to a liquid container;

a rod-like member extending from the support member such as to be in a generally horizontal disposition with the sensor side-mounted to the liquid container;

a switch coupled to the rod-like member;

a buoyant member having a slot extending therein and receiving the rod-like member, the slot having an upper end and a lower end and sufficient room to allow the buoyant member to move vertically with the sensor held in the liquid container between a first position and a second position depending upon the liquid level in the liquid container, the rod-like member being located proximate the top end of the slot and spaced away from the bottom end of the slot in the first position, the rod-like member being located proximate the bottom end of the slot and spaced away from the top end of the slot in the second position, wherein the top end of the slot opens to an outside surface of the buoyant member to define a slot opening sized to pass the rod-like member therethrough and into the slot;

limit structure on the buoyant member and on the rod-like member cooperating to permit the rod-like member to pass into the buoyant member slot through the slot opening with the rod-like member in a first angular orientation with respect to the buoyant member and to normally prevent the rod-like member from passing back out of the buoyant member slot through the slot opening with the rod-like member in a second angular orientation with respect to the buoyant member; and a switch actuator coupled to the buoyant member for activating the switch depending upon the position of the buoyant member relative the rod-like member.

* * * * *

UNITED STATES PATENT AND TRADEMARK OFFICE
CERTIFICATE OF CORRECTION

PATENT NO. : 5,581,062
DATED : December 3, 1996
INVENTOR(S) : GOMEZ, Edward Jr.

It is certified that error appears in the above-indentified patent and that said Letters Patent is hereby corrected as shown below:

Col. 3, line 13, change "left, fight" to read --left, right--.

Col. 7, line 15, change "rod-like sides" to read --rod-like member sides--.

Signed and Sealed this

Tenth Day of June, 1997

BRUCE LEHMAN

Attest:

Attesting Officer

Commissioner of Patents and Trademarks